United States Patent [19]

Simon

[11] Patent Number: 5,531,410
[45] Date of Patent: Jul. 2, 1996

[54] CABLE WAY FORMED BY WELDED TRELLISWORK

[75] Inventor: Bernard Simon, Caluire, France

[73] Assignee: Mavil, Liernais, France

[21] Appl. No.: 272,619

[22] Filed: Jul. 11, 1994

Related U.S. Application Data

[63] Continuation of Ser. No. 4,270, Jan. 14, 1993, abandoned.

[30] Foreign Application Priority Data

Jan. 20, 1992 [FR] France .................................. 92 00723

[51] Int. Cl.⁶ ....................................................... F16L 3/00
[52] U.S. Cl. ............................................................ 248/49
[58] Field of Search ............................ 248/49, 175, 302; 211/181; 174/68.3

[56] References Cited

U.S. PATENT DOCUMENTS

| | | | |
|---|---|---|---|
| 3,948,473 | 4/1976 | Mason | 248/49 |
| 4,597,616 | 7/1986 | Trubiano | 211/181 X |
| 5,103,799 | 4/1992 | Atanasio | 211/181 X |
| 5,169,010 | 12/1992 | Fortner | 211/181 X |

*Primary Examiner*—Ramon O. Ramirez
*Attorney, Agent, or Firm*—Dowell & Dowell

[57] ABSTRACT

A cable way composed of welded trelliswork which includes U-shaped transverse wires having lateral branches with the outer ends bent outwardly to form a hook and wherein at least one marginal wire is welded inside the formed hooks.

3 Claims, 2 Drawing Sheets

CABLE WAY FORMED BY WELDED TRELLISWORK

This application is a continuation of application Ser. No. 08/004,270, filed Jan. 14, 1993, now abandoned.

FIELD OF THE INVENTION

1. Background of the Invention

The present invention relates to a cable way composed of welded trelliswork of which the upper edges of the transverse wires are shaped to avoid any damage to the cables or piping transporting fluid.

2. History of the Related Art

Cable ways of this type are known, which generally comprise portions in the form of gutters which are assembled on one another to support various conducts and a in particular, electrical cables. Each portion of cable way is constituted by U-shaped transverse wires on the underside of which are welded, longitudinal wires and on the outside of the branches of the U, are welded marginal wires. The portions of cable way comprise, depending on their dimensions, a certain number of transverse wires, longitudinal wires and marginal wires.

Such portions of cable way present the drawback of risking damage to the electrical cables when they are placed in position and more particularly those cables located near the upper ends of the transverse wires. Such damage is essentially due to the cutting edges of the upper ends of the transverse wires.

It is a more particular object of the present invention to overcome these drawbacks.

SUMMARY OF THE INVENTION

To that end, each portion of cable way composed of welded trelliswork according to the invention which includes U-shaped transverse wires, having lateral arms with upper ends which are bent outwardly to form a hook, and at least one of the marginal wires is welded inside the fold made by the hook.

Other advantages according to the invention consist in that two marginal wires of different diameters or of the same diameters may be welded inside the fold or bends of each transverse wire in order to constitute an assembly of greater rigidity.

Moreover, another advantage according to the invention consists in that the folds or bends formed by each hook increase the safety of the cable ways, as they make it possible to retain the marginal wires in the event of rupture of welded spots.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
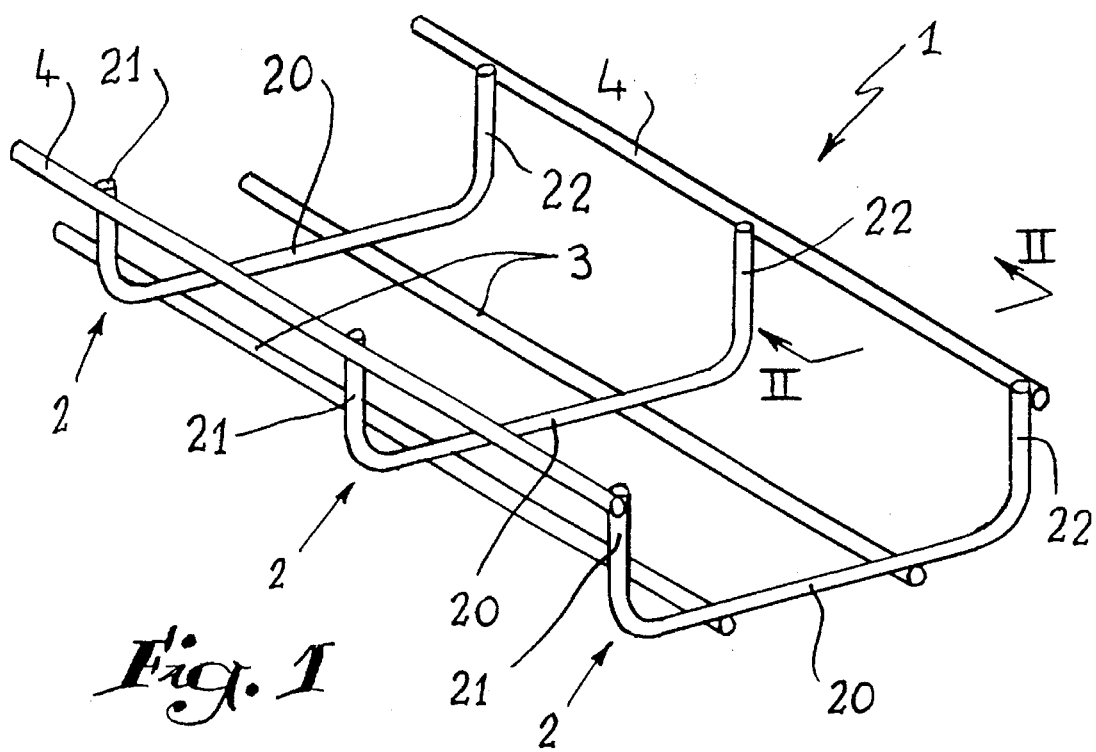
FIG. 1 is a view, in perspective, illustrating a portion of cable way of the prior art.

Referring now to the drawings, FIG. 1 shows a portion of cable way 1 including a certain number of U-shaped transverse wires 2 connected to one another via longitudinal wires 3 welded beneath web segment 20 of the U. The number of longitudinal wires 3 varies depending on the width of the web segment 20. Each transverse wire 2 comprises lateral branches 21 and 22 which are respectively connected to the adjacent lateral wires by marginal wires 4 of which the number varies depending on the height of the branches. However, whatever the height of the branches of the transverse wires 2 and the number of marginal wires 4, there is always at least one marginal wire which is welded on the end of the lateral branches 21 and 22 of each transverse wire 2 so as to render the assembly perfectly rigid.

Figure 2:
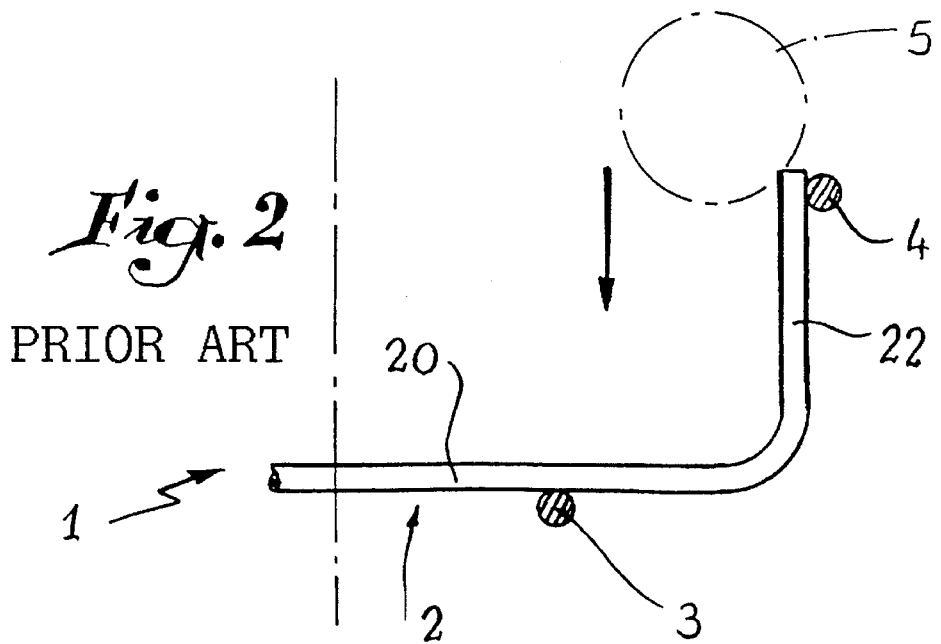
FIG. 2 is a half-section along line II—II (FIG. 1) showing the risks of injury of a cable while it is being placed in position.

FIG. 2 shows the positioning of an element 5, for example an electrical cable. It will be noted that the cable, when it is being introduced, may be damaged by the ends of the lateral branches 21 and 22 of each transverse wire 2.

It is ascertained that the ends of each lateral branch 21 and 22 project and are particularly sharp, thus risking cutting the sheath of the electrical cable 5 and provoking either short circuits or greater damage. Such damage may occur when the cables are being placed in position or when the cable way is too full and the electrical cable 5 is in abutment on the end of the lateral branches 21 and 22 of the transverse wires 2.

Figure 3:
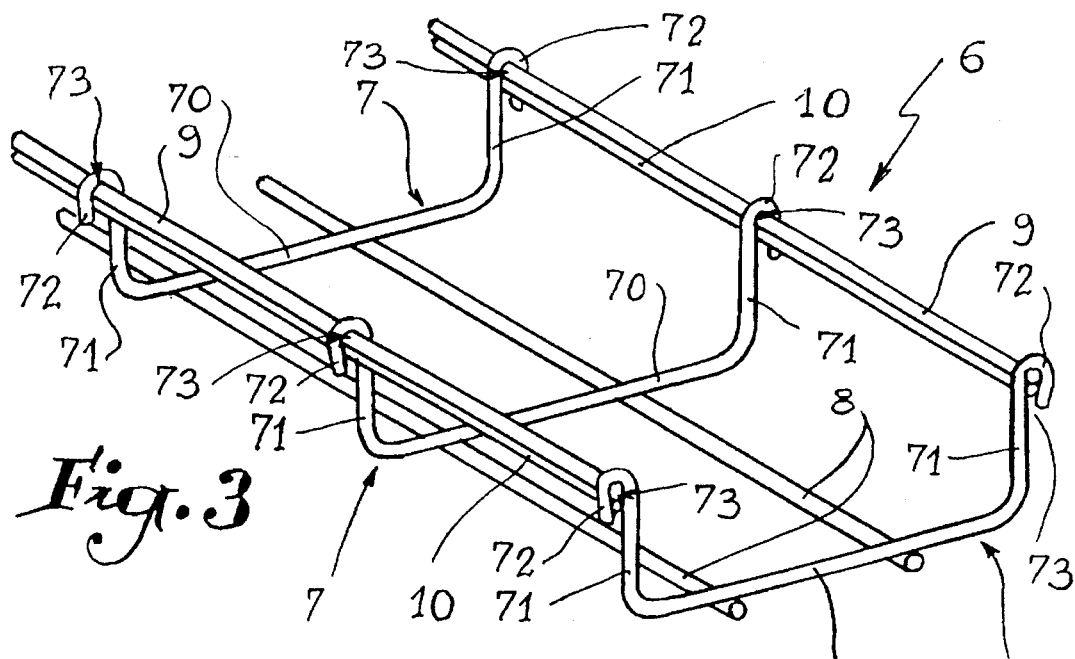
FIG. 3 is a view in perspective illustrating a portion of cable way according to the present invention.
Figure 4:
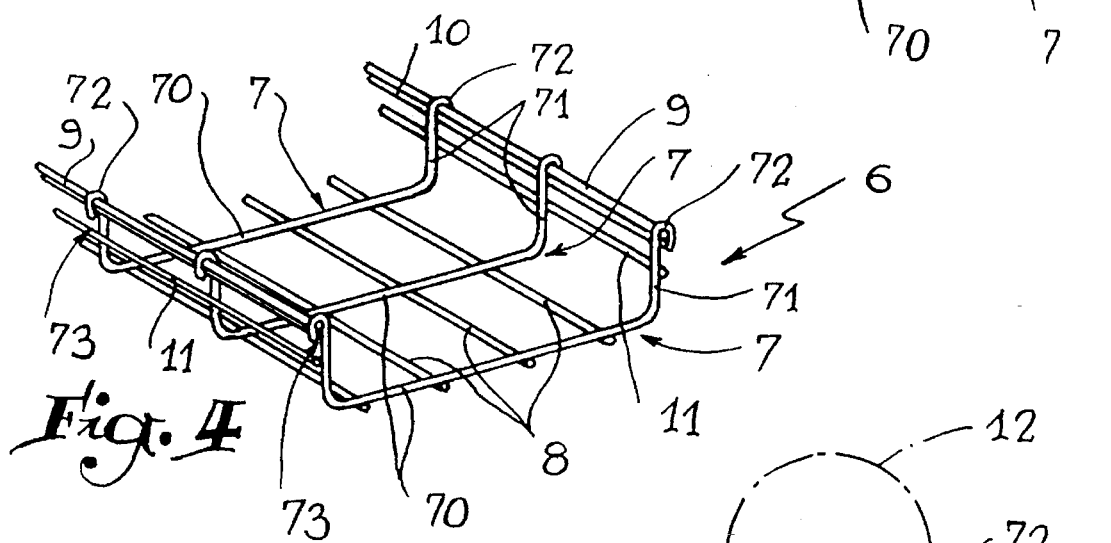
FIG. 4 is a view in perspective, similar to that of FIG. 3, showing a variant embodiment of a portion of cable way.

FIG. 3 shows a portion of cable way 6 according to the present invention, including a certain number of U-shaped transverse wires 7. Each transverse wire 7 principally includes a web 70 and lateral branches 71. The ends of the branches are bent outwardly of the U to form a hook 72. The underneath of the web 70 of the transverse wires 7 is secured to longitudinal wires 8 whose number varies depending on the width of the web 70, as shown in FIG. 4. Inside the folds or bends 73 formed by the hooks 72 of each transverse wire 7, are welded two marginal wires 9 and 10 of different diameters. These marginal wires rigidify the structure of the portion of cable way 6.

When the lateral branches 71 of the transverse wires 7 are of a greater height, there is provided below hooks 72 another marginal wire 11 adapted to consolidate the assembly of the portion of cable way 6 (FIG. 4).

Figure 5:
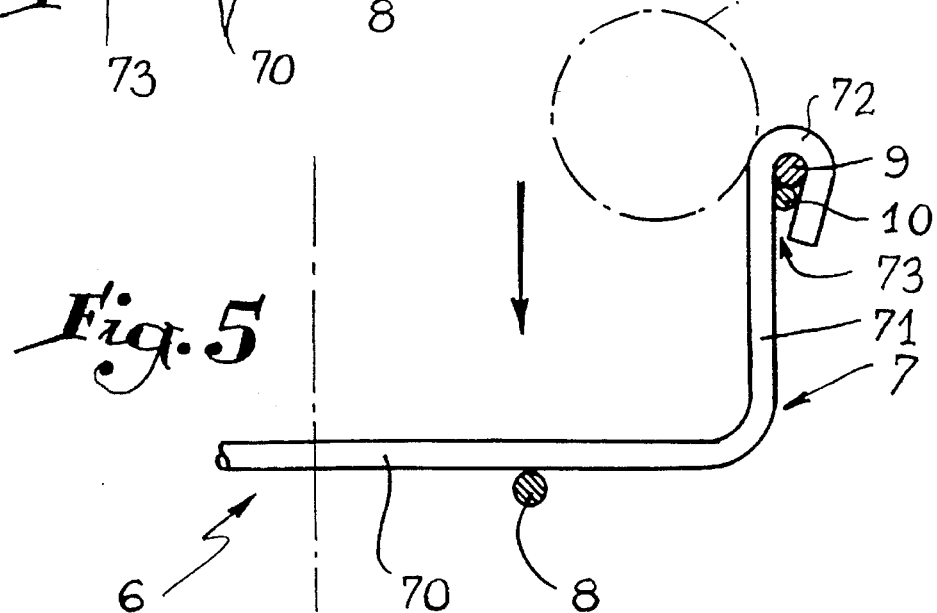
FIG. 5 is a half-section along V—V (FIG. 3) illustrating the positioning of a cable inside the portion of cable way according to the invention.

FIG. 5 shows the positioning of an element 12, for example an electrical cable. It will be noted that the cable may come into contact with the upper ends of the transverse wires 7 without risk of damage. In fact, the outer periphery of the hooks 72 of each transverse wire 7 presents a rounded form inside the portion of cable way 6, which avoids damage to the electrical cable 12 either when it is being placed in position or when it is in constant abutment against at least one of its sides.

Moreover, the ends of the hooks 72 which are located outside each portion of cable way 6 make it possible to hook a protective cover known per se (not shown).

Each portion of cable way 6 is immersed in a bath of plastics material such as epoxy with a view to protecting them.

It must, moreover, be understood that the foregoing description has been given only by way of example and that it in no way limits tile domain of the invention which would not be exceeded by replacing the details of execution described by any other equivalents.

What is claimed is:

1. In a cable way having welded trelliswork including generally U-shaped transverse wires having intermediate web segments and branch portions, and the web segments being secured to longitudinal wires, the improvement comprising, each of the branch portions of the transverse wires having outer ends bent in a configuration of a hook oriented outwardly with respect to the web segments, and at least one marginal wire being welded within said hooks to thereby reinforce the trelliswork.

2. The improvement to a cable way of claim 1 including two marginal wires of different diameters welded inside said hooks.

3. The cable way of claim 1, comprising two marginal wires of the same diameter welded to the lateral branch portions inside said hooks.

* * * * *